United States Patent
Muthiah et al.

(10) Patent No.: US 12,008,251 B2
(45) Date of Patent: Jun. 11, 2024

(54) RATE LEVELLING AMONG PEER DATA STORAGE DEVICES

(71) Applicant: Western Digital Technologies, Inc., San Jose, CA (US)

(72) Inventors: Ramanathan Muthiah, Bangalore (IN); Judah Gamliel Hahn, Ofra (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/846,316

(22) Filed: Jun. 22, 2022

(65) Prior Publication Data

US 2023/0418490 A1    Dec. 28, 2023

(51) Int. Cl.
*G06F 3/06* (2006.01)
*G06F 11/10* (2006.01)

(52) U.S. Cl.
CPC ............ *G06F 3/064* (2013.01); *G06F 3/0604* (2013.01); *G06F 3/0688* (2013.01); *G06F 11/1076* (2013.01)

(58) Field of Classification Search
CPC ...... G06F 3/064; G06F 3/0604; G06F 3/0688; G06F 11/1076
See application file for complete search history.

(56) References Cited

U.S. PATENT DOCUMENTS

| | | |
|---|---|---|
| 10,409,511 B1 * | 9/2019 | Subbarao .............. G06F 3/0607 |
| 10,592,144 B2 | 3/2020 | Roberts et al. |
| 10,725,941 B2 | 7/2020 | Subbarao et al. |
| 10,901,848 B2 | 1/2021 | Roberts |
| 11,182,258 B2 | 11/2021 | Knestele et al. |
| 11,281,601 B2 | 3/2022 | Subbarao et al. |
| 2014/0380303 A1 | 12/2014 | Bello et al. |
| 2018/0081594 A1 | 3/2018 | Jung et al. |
| 2020/0042208 A1 * | 2/2020 | Roberts ................. G06F 3/0605 |
| 2020/0042217 A1 * | 2/2020 | Roberts ................. G06F 3/0655 |
| 2020/0042380 A1 * | 2/2020 | Roberts ................. G06F 3/0614 |
| 2020/0042390 A1 * | 2/2020 | Roberts ............... G06F 11/1092 |
| 2021/0073141 A1 | 3/2021 | Conklin et al. |
| 2021/0281639 A1 * | 9/2021 | Kachare .............. H04L 41/0813 |
| 2021/0334030 A1 | 10/2021 | Yang et al. |
| 2022/0066925 A1 | 3/2022 | Park et al. |
| 2022/0318091 A1 * | 10/2022 | Jeon .................... G06F 13/1605 |

* cited by examiner

*Primary Examiner* — Ryan Bertram
(74) *Attorney, Agent, or Firm* — Patent Law Works LLP

(57) ABSTRACT

Example storage systems, data storage devices, and methods provide rate levelling among peer storage devices. A master storage device among peer storage devices receives host commands, determines the workload states of the peer storage devices, divides the data units in the host commands into data blocks for data striping, allocates the data blocks among the peer storage devices, and sends the data blocks to the peer storage devices using a peer communication channel.

20 Claims, 6 Drawing Sheets

RATE LEVELLING AMONG PEER DATA STORAGE DEVICES

TECHNICAL FIELD

The present disclosure generally relates to data storage systems, and in a more particular example, to data storage systems including data storage devices capable of peer-to-peer communication for data striping.

BACKGROUND

Multi-device storage systems utilize multiple discrete storage devices, generally disk drives (solid-state drives, hard disk drives, hybrid drives, tape drives, etc.) for storing large quantities of data. These multi-device storage systems are generally arranged in an array of drives interconnected by a common communication fabric and, in many cases, controlled by a storage controller, redundant array of independent disks (RAID) controller, or general controller, for coordinating storage and system activities across the array of drives. The data stored in the array may be stored according to a defined RAID level, a combination of RAID schemas, or other configurations for providing desired data redundancy, performance, and capacity utilization. In general, these data storage configurations may involve some combination of redundant copies (mirroring), data striping, and/or parity (calculation and storage), and may incorporate other data management, error correction, and data recovery processes, sometimes specific to the type of disk drives being used (e.g., solid-state drives (SSDs), hard disk drives (HDDs), tape drives, hybrid drives, etc.).

Some multi-device storage systems employ striping of host data to handle high-bandwidth data by sharing the write load across data storage devices and enabling parallel writing at the device level. In some configurations, the host interfaces with a bridge chip or similar hardware and/or software device to provide the high-bandwidth interface to multiple data storage devices. In some configurations, the host itself may be equipped with a host driver rapidly determining how host data will be divided and distributed among the data storage devices. In either of these prior configurations, the striping decisions are made outside of the set of data storage devices receiving the host data and require additional hardware and/or a more complex interface on the host side.

Therefore, there still exists a need for a storage system that enables a group of data storage devices, such as SSDs, to process high-bandwidth data using data striping without using host or intermediate resources other than a peer-to-peer communication channel.

SUMMARY

Various aspects for rate levelling among peer storage devices, particularly, data striping using a peer data storage device as the master data rate leveller are described.

One general aspect includes a storage device including: a processor; a memory; a non-volatile storage medium; an interface configured to communicate with a plurality of peer storage devices over a peer communication channel; and a peer rate leveller, stored in the memory for execution by the processor. The peer rate leveller is configured to: receive a host storage command for a data unit from a host system; determine workload states for the plurality of peer storage devices; divide the data unit into a plurality of data blocks; allocate, based on the workload states, the plurality of data blocks to target peer storage devices among the plurality of peer storage devices; and send, through the peer communication channel, the plurality of data blocks to the target peer storage devices.

Implementations may include one or more of the following features. The peer rate leveller may be further configured to determine thermal states for the plurality of peer storage devices, and allocating the plurality of data blocks to the target peer storage devices may be further based on the thermal states. The peer rate leveller may be further configured to determine endurance values for the plurality of peer storage devices, and allocating the plurality of data blocks to the target peer storage devices may be further based on the endurance values. The peer rate leveller may be further configured to: query each peer storage device of the plurality of peer storage devices for peer state data; receive, from each peer storage device of the plurality of peer storage devices, the peer state data for that peer storage device; store the peer state data for each peer storage device of the plurality of peer storage devices; and use the peer state data to select the target peer storage devices among the plurality of peer storage devices. The storage device may include a host logical block address mapping table configured to map host logical block addresses to storage locations among the plurality of peer storage devices, where the peer rate leveller is further configured to: determine a peer storage location for each data block of the plurality of data blocks; and store, for each data block of the plurality of data blocks, the peer storage location in the host logical block address mapping table. The storage device may include a remotely addressable memory configured to include a controller memory buffer, where the peer rate leveller is further configured to receive the host storage command to at least one command queue in the controller memory buffer. Each peer storage device of the plurality of peer storage devices may include a peer controller memory buffer configured to receive peer storage commands in at least one command queue; and the peer rate leveller may be further configured to send the plurality of data blocks to the target peer storage devices by writing each data block in at least one peer storage command to the at least one command queue of a corresponding target peer storage device. The peer rate leveller may be further configured to send each data block from the controller memory buffer to the peer controller memory buffer of the target peer storage device through the peer communication channel using direct memory access. The storage device may include: a media manager, stored in the memory for execution by the processor, configured to manage storage operations to the non-volatile storage medium; and a workload state machine, stored in the memory for execution by the processor, configured to determine a local workload state for the storage operations to the non-volatile storage medium, where the peer rate leveller is further configured to allocate, based on the local workload state, at least one data block of the plurality of data blocks to the non-volatile storage medium. The storage device may include master handoff logic, stored in the memory for execution by the processor, configured to: determine a next master storage device from the plurality of peer storage devices; and transfer peer rate leveller functions to the next master storage device.

Another general aspect includes a computer-implemented method including: establishing, among a plurality of peer storage devices, a peer communication channel; receiving, by a first peer storage device of the plurality of peer storage devices, a host storage command for a data unit from a host system; determining, by the first peer storage device, workload states for the plurality of peer storage devices; dividing, by the first peer storage device, the data unit into a plurality of data blocks; allocating, by the first peer storage device and based on the workload states, the plurality of data blocks to target peer storage devices among the plurality of peer storage devices; and sending, by the first peer storage device and through the peer communication channel, the plurality of data blocks to the target peer storage devices.

Implementations may include one or more of the following features. The computer-implemented method may include determining, by the first peer storage device, thermal states for the plurality of peer storage devices, where allocating the plurality of data blocks to the target peer storage devices is further based on the thermal states. The computer-implemented method may include determining, by the first peer storage device, endurance values for the plurality of peer storage devices, where allocating the plurality of data blocks to the target peer storage devices is further based on the endurance values. The computer-implemented method may include: querying, by the first peer storage device, each peer storage device of the plurality of peer storage devices for peer state data; receiving, by the first peer storage device and from each peer storage device of the plurality of peer storage devices, the peer state data for that peer storage device; storing, by the first peer storage device, the peer state data for each peer storage device of the plurality of peer storage devices; and using, by the first peer storage device, the peer state data to select the target peer storage devices among the plurality of peer storage devices. The computer-implemented method may include: determining, by the first peer storage device, a peer storage location for each data block of the plurality of data blocks; and storing, by the first peer storage device and for each data block of the plurality of data blocks, the peer storage location in a host logical block address mapping table, where The host logical block address mapping table is configured to map host logical block addresses to storage locations among the plurality of peer storage devices. The computer-implemented method may include receiving, by the first peer storage device, the host storage command to at least one command queue in a controller memory buffer configured in a remotely addressable memory of the first peer storage device. The computer-implemented method may include sending, by the first peer storage device, the plurality of data blocks to the target peer storage devices by writing each data block in at least one peer storage command to at least one command queue of a corresponding target peer storage device, where each peer storage device of the plurality of peer storage devices may include a controller memory buffer configured in a remotely addressable memory to receive peer storage commands in at least one command queue. The computer-implemented method may include sending each data block from the controller memory buffer of the first peer storage device to the controller memory buffer of the target peer storage device through the peer communication channel using direct memory access. The computer-implemented method may include: determining a next master storage device from the plurality of peer storage devices; and transferring peer rate leveller functions from the first peer storage device to the next master storage device.

Still another general aspect includes a storage system including a plurality of peer storage devices, where a first peer storage device of the plurality of peer storage devices includes: a non-volatile storage medium; means for establishing, among a plurality of peer storage devices, a peer communication channel; means for receiving, by the first peer storage device, a host storage command for a data unit from a host system; means for determining, by the first peer storage device, workload states for the plurality of peer storage devices; means for dividing, by the first peer storage device, the data unit into a plurality of data blocks; means for allocating, by the first peer storage device and based on the workload states, the plurality of data blocks to target peer storage devices among the plurality of peer storage devices; and means for sending, by the first peer storage device and through the peer communication channel, the plurality of data blocks to the target peer storage devices.

The various embodiments advantageously apply the teachings of multi-device storage systems and their component data storage devices to improve the functionality of such computer systems. The various embodiments include operations to overcome or at least reduce the issues in the previous storage systems discussed above and, accordingly, are more efficient and scalable than other computer data storage architectures for some applications. That is, the various embodiments disclosed herein include hardware and/or software with functionality to improve the efficiency and scalability of high-bandwidth data management, based on managing data striping across a plurality of peer storage devices using a data storage device as the master rate leveller. Accordingly, the embodiments disclosed herein provide various improvements to storage systems.

It should be understood that language used in the present disclosure has been principally selected for readability and instructional purposes, and not to limit the scope of the subject matter disclosed herein.

DETAILED DESCRIPTION

Figure 1:
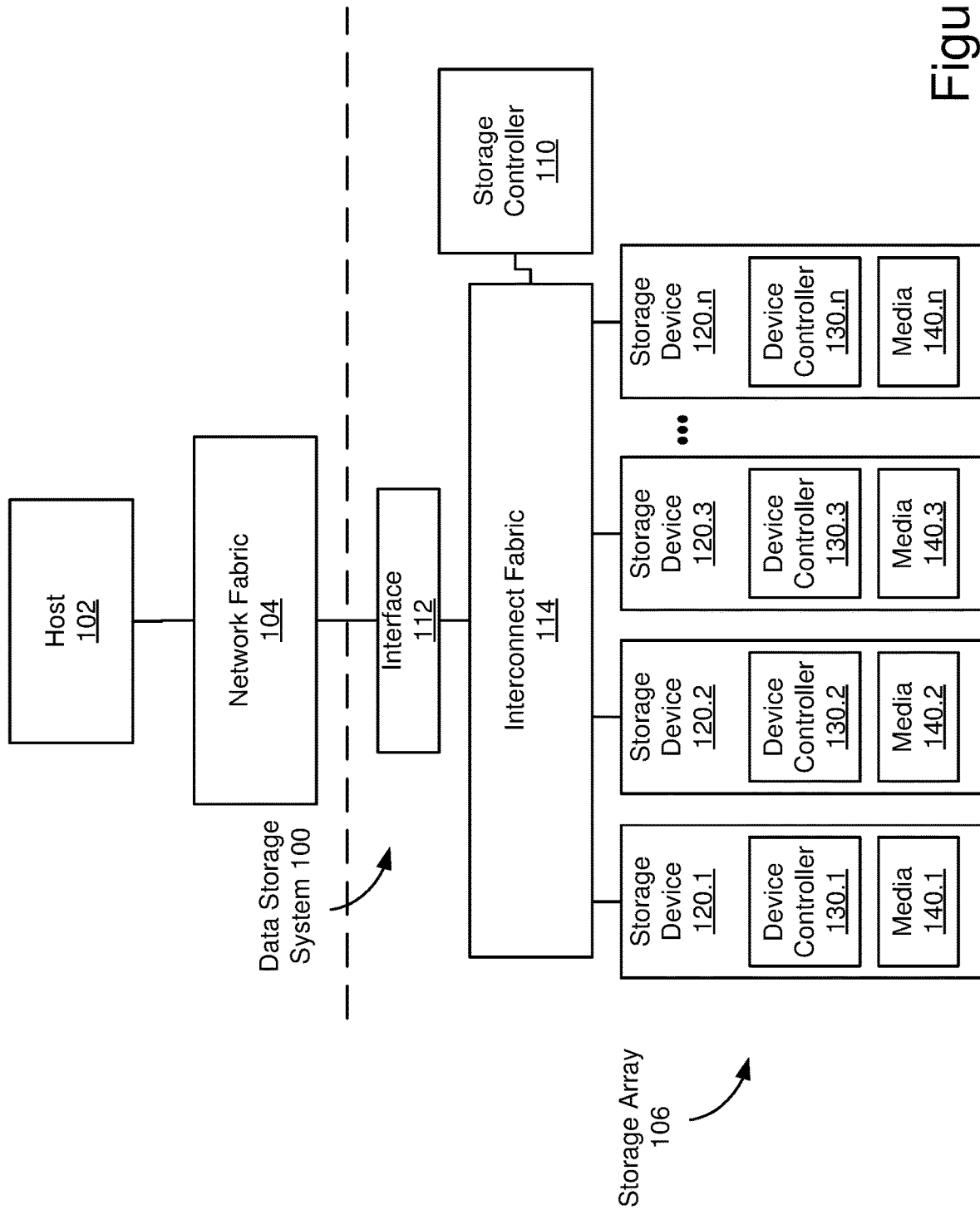
FIG. 1 schematically illustrates an example of a multi-device storage system.

FIG. 1 shows an embodiment of an example data storage system 100 including a peer group of data storage devices 120 coupled with each other for peer-to-peer communication. While some example features are illustrated, various other features have not been illustrated for the sake of brevity and so as not to obscure pertinent aspects of the example embodiments disclosed herein. To that end, as a non-limiting example, data storage system 100 includes a storage array 106 of one or more data storage devices 120 (also sometimes called information storage devices, storage devices, or memory devices) configured for storage of host data in a non-volatile storage medium.

In some embodiments, the data storage devices 120 are, or include, solid-state drives (SSDs). Each data storage device 120.1-120.n may include a non-volatile memory (NVM) or device controller 130 based on compute resources (processor and memory) and a plurality of NVM or media devices 140 for data storage (e.g., one or more NVM device(s), such as one or more flash memory devices). In some embodiments, a respective data storage device 120 of the one or more data storage devices includes one or more NVM controllers, such as flash controllers or channel controllers (e.g., for storage devices having NVM devices in multiple memory channels).

In some embodiments, a respective data storage device 120 may include a single media device 140 while in other embodiments the respective data storage device 120 includes a plurality of media devices. In some embodiments, media devices include NAND-type flash memory or NOR-type flash memory. In some embodiments, data storage device 120 includes one or more hard disk drives (HDDs), tape drives, or hybrid drives. In some embodiments, data storage devices 120 may include a flash memory device, which in turn includes one or more flash memory die, one or more flash memory packages, one or more flash memory channels or the like. However, in some embodiments, one or more of the data storage devices 120 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

Storage controller 110 may be coupled to data storage devices 120.1-120.n through interconnect fabric 114. In some embodiments, storage controller 110 may be hosted as a component and/or a subsystem of another component of data storage system 100. For example, in some embodiments, some or all of the functionality of storage controller 110 may be implemented by software executed on one or more compute resources in at least one of data storage devices 120.1-120.n, interconnect fabric 114, or interface 112. Storage controller 110 is sometimes called a controller system, a main controller system, a non-volatile memory express (NVMe) controller, garbage collection (GC) leader, network interface controller, RAID controller, or storage virtualization controller (SVC). In some embodiments, a device controller 130.1 associated with a particular storage device (e.g., 120.1) acts as storage controller 110 for other storage devices (e.g., 120-2, 120-3, and 120.n) in data storage system 100. In some embodiments, storage controller 110, the one or more device controllers 130, and media devices 140 are included in the same physical device (i.e., an integrated device) as components thereof, such as an all-flash array appliance. In some embodiments, storage controller 110 is a component and/or subsystem of host 102.

In some embodiments, host 102 is coupled to data storage system 100 through interface 112 over a network fabric 104. In some embodiments, multiple hosts 102 (only one of which is shown in FIG. 1) are coupled to data storage system 100 through interface 112, which may be a storage network interface or other interface capable of supporting communications with multiple hosts 102. Network fabric 104 may include a wired and/or wireless network (e.g., public and/or private computer networks in any number and/or configuration) which may be coupled in a suitable way for transferring data. For example, network fabric 104 may include any means of a conventional data communication network such as a local area network (LAN), a wide area network (WAN), a telephone network, such as the public switched telephone network (PSTN), an intranet, the internet, or any other suitable communication network or combination of communication networks. In some embodiments, interface 112 includes one or more network and/or peripheral communication bus interfaces for data storage system 100, such as the physical interface for storage controller 110 and/or a shared network or peripheral bus comprising interconnect fabric 114.

Host 102, or a respective host in a system having multiple hosts, may be any suitable computer device, such as a computer, a laptop computer, a tablet device, a netbook, an internet kiosk, a personal digital assistant, a mobile phone, a smart phone, a gaming device, a computer server, or any other computing device. Host 102 is sometimes called a host system, client, or client system. In some embodiments, host 102 is a server system, such as a server system in a data center. In some embodiments, the one or more hosts 102 are one or more host devices distinct from storage controller 110 and distinct from the plurality of storage devices 120; but in some other embodiments, the one or more hosts 102 include one of the storage devices 120 that has been configured to perform data processing operations and to send data storage commands to access data stored in the one or more storage devices 120. In some other embodiments, the one or more hosts 102 are configured to store and access data in the plurality of storage devices 120.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

The one or more device controllers 130, if included in a respective storage device 120, are coupled with storage controller 110 through interconnect fabric 114. Interconnect fabric 114 is sometimes called a data connection, but typically convey commands in addition to data, and optionally convey metadata, error correction information and/or other information in addition to data values to be stored in media devices 140 and data values read from media devices 140. For example, storage devices 120 may include a peripheral component interconnect express (PCIe), serial advanced technology attachment (SATA), serial attached [small computer serial interface (SCSI)](SAS), fibre channel, ethernet, or similar interface that may be configured to support node addressing and routing for host data channels to storage devices 120 for communicating host storage commands and responses. In some embodiments, these same host interfaces may be configured to establish peer-to-peer communication through interconnect fabric 114 and establish a peer communication channel that does not rely on host 102 for communication of peer messaging and/or peer storage commands.

In some embodiments, storage devices 120 include a plurality of media devices 140, such as flash memory devices, and optionally includes fewer device controllers 130. Viewed another way, in some embodiments, a storage device 120 includes multiple memory channels, each of which has a device controller 130 and a set of media devices 140 coupled to the device controller 130. However, in some embodiments, two or more memory channels share a device controller 130. In either example, each memory channel has its own distinct set of media devices 140. In a non-limiting example, the number of memory channels in a typical storage device is 8, 16, or 32. In another non-limiting example, the number of media devices 140 per memory channel is typically 8, 16, 32, or 64. Furthermore, in some embodiments, the number of media devices 140 in one memory channel is different from the number of media devices in another one of the memory channels.

In some embodiments, each device controller of device controllers 130 includes one or more processing units (also sometimes called CPUs or processors or microprocessors or microcontrollers) configured to execute instructions in one or more programs (e.g., in device controllers 130). In some embodiments, the one or more processors are shared by one or more components within, and in some cases, beyond the function of device controllers 130. As noted above, media devices 140 are coupled to device controllers 130 through connections that typically convey commands in addition to data, and optionally convey metadata, error correction information and/or other information in addition to data values to be stored in media devices 140 and data values read from media devices 140. Media devices 140 may include any number (i.e., one or more) of memory devices including, without limitation, non-volatile semiconductor memory devices, such as flash memory device(s).

Flash memory device(s) (e.g., media devices 140) can be configured for enterprise storage suitable for applications such as cloud computing, for database applications, primary and/or secondary storage, or for caching data stored (or to be stored) in secondary storage, such as hard disk drives. Additionally, and/or alternatively, flash memory device(s) (e.g., media devices 140) can also be configured for relatively smaller-scale applications such as personal flash drives or hard-disk replacements for personal, laptop, and tablet computers. Although flash memory devices and flash controllers are used as an example here, in some embodiments storage device(s) 120 include other non-volatile memory device(s), including magnetic disk or magnetic tape, and corresponding non-volatile storage controller(s).

In some embodiments, media devices 140 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

Figure 2:
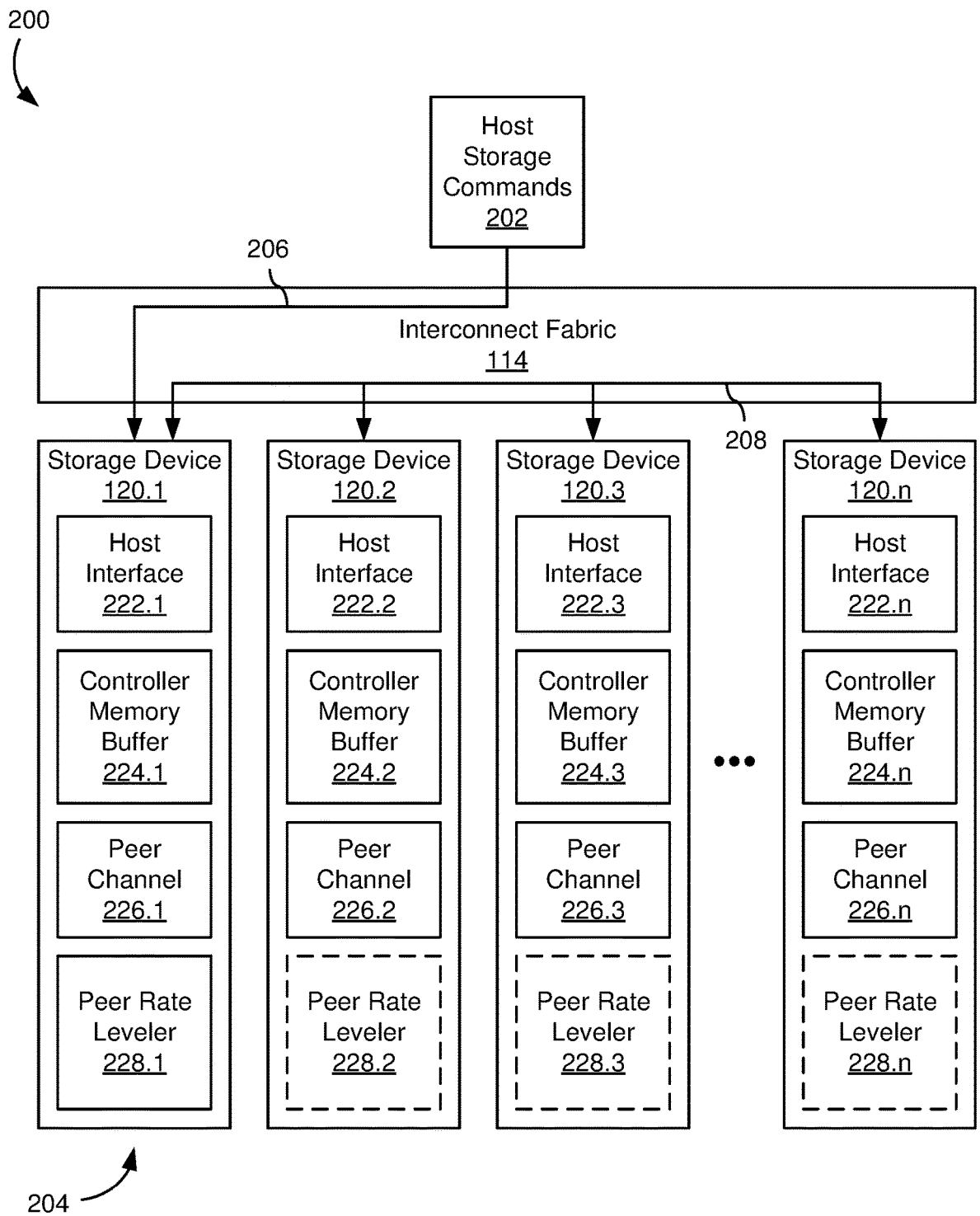
FIG. 2 schematically illustrates an example peer rate levelling configuration for the storage system of FIG. 1.

FIG. 2 is a block diagram illustrating an example peer rate levelling configuration 200 for the data storage system 100, in accordance with some embodiments, as shown in FIG. 1. In the example shown, at least four storage devices 120.1-120.n are configured as a peer group. Host storage commands 202 may be received through interconnect fabric 114, such as from a host system, either directly or through a storage controller, network interface controller, or similar component. In the example shown, storage device 120.1 has been designated as the master storage device 204 for the peer rate levelling functions and receives host data commands 202. Each storage device 120 may communicate with the other peer storage devices using peer communication channel 208 through interconnect fabric 114. For example, storage device 120.1 may request and receive state information from storage devices 120.2, 120.3, and 120.n and may selectively direct peer storage commands for data striping of the data units in host storage commands 202 to storage devices 120.2, 120.3, and 120.n.

Each storage device 120 may include a host interface 222 configured for high-bandwidth communication of host data to and from the non-volatile storage medium of that storage device. For example, host interfaces 222.1-222.n may include PCIe interfaces connected to interconnect fabric 114 that support NVMe storage protocols for data transfer and management commands. In some embodiments, each storage device 120 may be configured as a storage node capable of receiving and processing host storage commands from a host system. During any given operating period, one storage device, such storage device 120.1, may be configured as master storage device 204 and all high-bandwidth write commands for data striping may be directed by the host system to master storage device 204. In some embodiments, the host system may only be mapped to master storage device 204 and may treat all storage locations in the peer group as belonging to master storage device 204.

Each storage device 120 may include a controller memory buffer 224 configured for direct memory access through host interface 222. For example, controller memory buffers 224.1-224.n may include remotely addressable memory locations supporting remote direct memory access (RDMA) protocols supporting command queues and data caching for host interfaces 222.1-222.n. In some embodiments, each storage device 120 may include one or more volatile buffer memory device configured for RDMA protocol access over interconnect fabric 114 that enables other nodes to directly write to and/or read from buffer memory locations according to NVMe protocol commands. For example, controller memory buffers 224 may include buffer storage locations designated for one or more command queues, such as host command queues for receiving host storage commands 202 and/or peer command queues for receiving peer storage commands through peer communication channel 208. Controller memory buffers 224 may also include buffer storage locations designated for one or more host data caches that receive host data units to be written to non-volatile memory from host storage commands 202 and/or data blocks allocated and sent by master storage device 204 to be written to non-volatile memory.

Each storage device 120 may include a peer channel 226 configured for peer-to-peer communication with the other storage devices in the peer group. For example, peer channels 226.1-226.n may include command/response messaging and/or host data transfer through host interface 222.1 and interconnect fabric 114 to establish peer communication channel 208. In some embodiments, master storage device 204 may map to peer storage devices, such as peer storage devices 120.2-120.n, as a host node and use a host command set, such as NVMe host commands, for determining storage device states and health parameters and forwarding data blocks from host data units for data striping. For example, NVMe protocols may enable storage device 120.1 to map to command queues in controller memory buffers 224.2-224.n and use drive state commands to determine one or more peer drive states and/or host write commands to write data blocks to the host data caches for the peer storage devices to put in non-volatile storage locations. In some configurations, a different peer communication channel than host interfaces 222 and interconnect fabric 114 may be used. For example, storage devices 120.1 may include secondary high-bandwidth interfaces for peer communications, such as a second PCIe interface and corresponding PCIe/NVMe interface processing resources, with a secondary bus or network connection among peer storage devices, such as a backplane bus or network.

In some embodiments, each peer storage device may include peer rate leveller 228 configured for executing the master storage device role and peer rate leveller functions for the peer group. For example, storage device 120.1 includes an active peer rate leveller 228.1 executing the functions of master storage device 204 and storage devices 120.2-120.n include inactive peer rate levellers 228.2-228.n that could enable any of them to take on the master storage device role. The functions of peer rate levellers 228 will be further explained with regard to FIG. 3.

In some embodiments, only storage device 120.1 (or whichever peer storage device is designated as master storage device 204) may include peer rate leveller 228.1 and the role may be configured in the hardware and/or software of the storage system at manufacture and/or installation. For example, storage device 120.1 may be configured with a larger volatile cache memory than peer storage devices to support a greater volume of host data and commands, as well as the parallel processing of peer storage commands for data striping to the peer storage devices. Even in such configurations, it may be possible to move the master storage device role to a peer storage device by later installing or activating a corresponding peer rate leveller 228 and the configuration could include one or more other storage devices with oversized caches to minimize performance changes due to role changes. In some embodiments, the master storage device role may be migrated to a different peer storage device due to an error, device failure, and/or endurance or health conditions of the current master storage device. In some embodiments, the master storage device role may be actively rotated to provide better wear levelling and distribution of the lifetime effects of the increased processing and memory use of master storage device 204. This rotation of the master role may be in addition to the dynamic allocation of write striping among peer storage devices and/or other rotation of peer storage device roles for wear levelling and other purposes.

Figure 3:
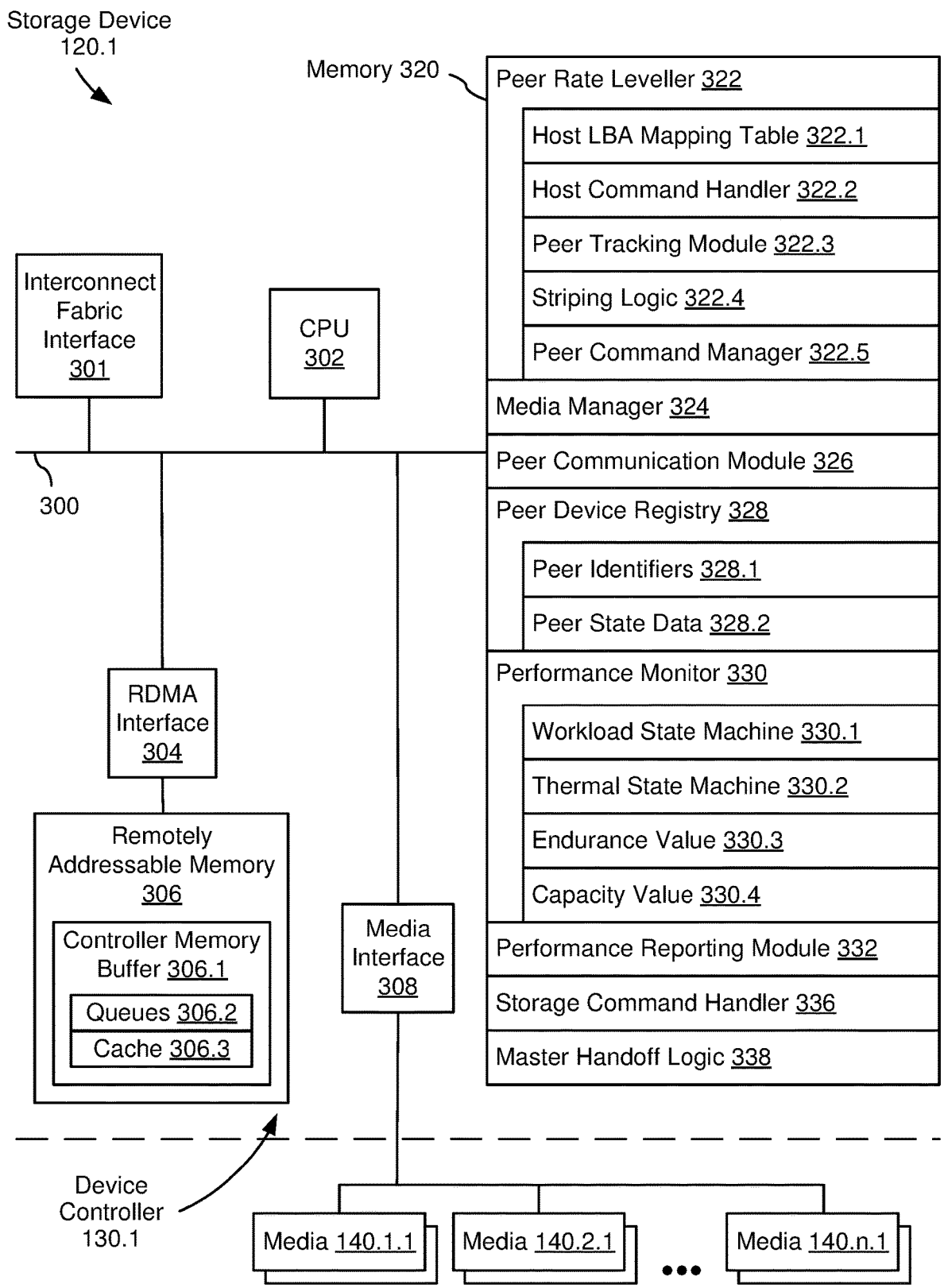
FIG. 3 schematically illustrates an example data storage device of the storage system of FIG. 1.

As shown in FIG. 3, a storage device 120.1 includes the functions of a device controller 130.1 and a peer rate leveller 322 using common compute resources, such as one or more processing units (CPUs 302), sometimes herein called CPU, processors, or hardware processors, and sometimes implemented using microprocessors, microcontrollers, or the like, configured to execute instructions in one or more programs, functions, or services (e.g., the modules in memory 320). In some embodiments, the one or more CPUs 302 are shared by one or more components within, and in some cases, beyond the function of storage device 120. The modules in memory 320 and executed by CPU 302 may be coupled to interconnect fabric interface 301, remote direct memory access (RDMA) interface 304, media interface 308, and any number of additional modules, such as erasure coding engines, error correction engines, specialized memory modules, etc., in order to coordinate the operation of these components. In some embodiments, the components of storage device 120.1 may be interconnected by one or more communication buses 300. In some embodiments, CPU 302, memory 320, media interface 308, and any number of additional modules may be packaged as a device controller 130.1, such as an NVM controller, implemented in an application-specific integrated circuit (ASIC), system on a chip (SoC), field programmable gate array (FPGA), or similar architecture.

One or more communication buses 300 optionally include circuitry (sometimes called a chipset) that interconnects and controls communications between system components. CPU 302 and memory 320 may be coupled to interconnect fabric interface 301, RDMA interface 304, remotely addressable memory 306, media interface 308, media devices 140.1, and any additional module(s) by the one or more communication buses 300. In some embodiments, interface hardware and/or protocols for providing communication through communication buses 300 may also be present for communication with any given component.

Storage device 120.1 may include a variety of local memory resources and local compute resources. In some embodiments, local resources may include components that are integrated into storage device 120.1 and may scale with the number of storage devices. Example local memory resources may include memory 320 (e.g. the operating memory of NVM controller 130.1), remotely addressable memory 306 (e.g. remotely addressable memory available through a remotely addressable interface), and other specialized memory (not shown). In some embodiments, storage media, such as media devices 140, may provide local memory resources for data management functions, but these may be distinct from storage locations for host data. Example local compute resources may include CPU 302 (e.g. the operating processor of device controller 130.1), erasure coding engines, error correction engines, and any other specialized processing systems. In some embodiments, one or more interfaces, such as interconnect fabric interface 301 or RDMA interface 304, may also include or utilize memory and/or compute resources and may be part of the available local resources of storage device 120.1.

Memory 320 may include high-speed random access memory, such as dynamic random access memory (DRAM), static random access memory (SRAM), (double data rate) DDR RAM, or other random access solid state memory devices, and may include non-volatile memory, such as one or more magnetic disk storage devices, optical disk storage devices, flash memory devices, or other non-volatile solid state storage devices. Memory 320 may optionally include one or more storage devices remotely located from CPU 302. In some embodiments, one or more additional memories may be provided for specific functions, such as an FTL memory for flash translation layer (FTL) data, and/or remotely addressable memory 306. These functional memories may include specialized processing, hardware acceleration, and/or other resources related to their function. In some embodiments, remotely addressable memory 306 may be part of memory 320.

In some embodiments, RDMA interface 304 may be a hardware, software, or combined hardware/software engine for providing remote data management access to remotely addressable memory 306. This may include local direct memory access (DMA) to remotely addressable memory 306 for CPU 302 or other components of device controller 130.1. The RDMA engines of RDMA interface 304 may allow storage device 120.1 to push or pull data from/to remotely addressable memory 306 and to/from similar remotely addressable memory locations in other storage devices (peer storage devices 120.1-120.n), storage controllers (e.g., storage controller 110), or servers (e.g., host 102).

Additional modules (not shown) supporting one or more functions of storage device 120 may be connected to bus 300, CPU 302, RDMA interface 304, media interface 308, and memory 320. In some embodiments, additional module(s) are executed in software by the CPU 302; in other embodiments, additional module(s) are implemented in whole or in part using special purpose circuitry (e.g., to perform encoding and decoding functions, parity calculation, encryption/decryption, etc.).

In some embodiments, during a write operation initiated by a host 102, storage system 100 receives a host write command (e.g., in a set of one or more host write commands) via interface 112 and directs the host write command to data storage device 120.1 (configured as master storage device 204) via interconnect fabric 114 (see FIG. 1). Storage device 120.1 receives the host write command through interconnect fabric interface 301 and directs the command to peer rate leveller 322 for processing. In some embodiments, storage device 120.1 may receive the host write command in a command queue 306.2 of controller memory buffer 306.1 configured in remotely addressable memory 306 and/or may receive the host data unit(s) to be written in cache 306.3 of controller memory buffer 306.1. The host write command may include one or more host data units and indicate one or more storage locations by host logical block address. In some embodiments, storage device 120.1 may manage the set of host logical block addresses corresponding to the aggregate storage locations of all of the peer group (e.g., the storage media locations in storage devices 120.2-120.n). Peer rate leveller 322 may divide the host data unit into data blocks for data striping, allocate the data blocks among the peer storage devices (including itself), and send the data units in peer write commands to the target peer storage devices. In some embodiments, the peer storage commands may be sent to the peer storage devices using RDMA to place the write command in a command queue on the corresponding controller memory buffer of the target data storage device. In some embodiments, the striping data blocks may be transferred directly from cache 306.3 in storage device 120.1 to the cache of the controller memory buffers of the target peer storage devices. The host data blocks may then be stored from cache to non-volatile storage media 140 by the target peer storage devices (including storage device 120.1 storing any data blocks allocated to non-volatile storage media 140).

In some embodiments, a storage media (e.g., media devices 140.1) is divided into a number of addressable and individually selectable blocks and each block is optionally (but typically) further divided into a plurality of pages and/or word lines and/or sectors, storage locations of defined storage unit sizes. While erasure of data from a storage medium is performed on a block basis, in many embodiments, reading and programming of the storage medium is performed on a smaller subunit of a block (e.g., on a page basis, word line basis, or sector basis). The data block size selected for striping host data to the peer storage devices may be configured to correlate to the erase block size of storage devices 120 or a multiple thereof to improve write efficiency.

In some embodiments, the smaller subunit of a block consists of multiple memory cells (e.g., single-level cells (SLC) or multi-level cells). In some embodiments, programming is performed on an entire page. In some embodiments, a multi-level cell (MLC) NAND flash typically has four possible states per cell, yielding two bits of information per cell. Further, in some embodiments, a MLC NAND has two page types: (1) a lower page (sometimes called the fast page), and (2) an upper page (sometimes called the slow page). In some embodiments, a triple-level cell (TLC) NAND flash has eight possible states per cell, yielding three bits of information per cell. Although the description herein uses TLC, MLC, and SLC as examples, those skilled in the art will appreciate that the embodiments described herein may be extended to memory cells that have more than eight possible states per cell, yielding more than three bits of information per cell. In some embodiments, the encoding format of the storage media (i.e., TLC, MLC, or SLC and/or a chosen data redundancy mechanism or error correction code (ECC)) is a choice made when data is actually written to the storage media.

In addition, these various memory cell configurations and encoding formats may impact the lifetime performance of storage device 120.1. Flash memory may have defined input/output (I/O) performance, endurance, write voltage thresholds, error rates, cell/device failures, and other parameters that may be tracked for specific performance values and/or contributions to storage capacity, quality of service (QoS), endurance, and/or overall health. Similarly, cell usage, read and write load balancing, garbage collection, and other operations may be tracked for endurance, reliability, and failure prediction for media devices 140. In some embodiments, storage devices 120 may include one or more device state machines for tracking workload, thermal, and other performance characteristics. In some embodiments, terabytes written (TBW) or a similar endurance value may be tracked for lifetime use (and predicted endurance) of the storage devices.

Storage device 120.1 may include a plurality of modules or subsystems that are stored and/or instantiated in memory 320 for execution by processor 302 as instructions, operations, or programs. For example, memory 320 may include a peer rate leveller 322 configured to receive host write commands and divide the write operations among the peer storage devices using data striping. Memory 320 may include a media manager 324 configured to manage storage operations to and from non-volatile memory 140.1. Memory 320 may include a peer communication module 326 configured for peer communication with peer storage devices over a peer communication channel. Memory 320 may include a peer device registry 328 configured for storing information about peer storage devices, including addressing and state information. Memory 320 may include a performance monitor 330 configured for monitoring various performance characteristics of storage device 120.1, such as workload and thermal states. Memory 320 may include a performance reporting module 332 configured to selectively report storage device state data and other parameters to hosts or peer storage devices. Memory 320 may include a storage command handler 336 configured to process storage commands, including peer data commands. Memory 320 may include master handoff logic 338 configured to manage passing the master storage device role and functions of peer rate leveller 322 to a different peer storage device. Memory 320, or alternatively the non-volatile memory device(s) within or accessible to memory 320, comprises a non-transitory computer readable storage medium for storing executable code for the modules or functions described.

Each of the above identified elements may be stored in one or more of the previously mentioned memory devices that together form memory 320 and corresponds to a set of instructions for performing a function described. The above identified modules or programs (i.e., sets of instructions) need not be implemented as separate software programs, procedures or modules, and thus various subsets of these modules may be combined or otherwise re-arranged in various embodiments. In some embodiments, memory 320 may store a subset of the modules and data structures identified above. Furthermore, memory 320 may store additional modules and data structures not described above. In some embodiments, some or all of these modules may be implemented with specialized hardware circuits that subsume part or all of the module functionality.

Peer rate leveller 322 may include interfaces, functions, parameters, and/or data structures for an offloaded and/or distributed service to enable storage device 120.1 and its peer storage devices to manage data striping of host data without specialized host storage commands or configuration of the host system. For example, peer rate leveller 322 may provide a unified storage device interface for the array of storage devices such that, from a host perspective, the peer group may be treated as a single addressable storage space with a capacity equal to the combined capacities of all of the storage devices (or portions thereof allocated to striping host write commands). In some embodiments, peer rate leveller 322 may include a host logical block address (LBA) mapping table 322.1 that provides mapping of host LBAs to storage locations across the peer storage devices. For example, host LBA mapping table 322.1 may include host LBAs for all host data units written to the peer group and may include striping data mapping from the host data units in which the host data was received to data striping data blocks distributed among the peer storage devices. Host LBA mapping table 322.1 may be used to both store the data striping allocations by identifying the host LBAs and the peer storage device that received the corresponding data blocks and to process subsequent read, delete, or other host storage commands targeting previously written host data by providing an LBA lookup to locate the peer storage device containing the LBA.

In some embodiments, peer rate leveller 322 may include a host command handler 322.2 configured to receive all host commands (or at least all host commands related to the host data identified for data striping). For example, the host system may be mapped only to storage device 120.1 and interconnect fabric interface 301 for host data configured for data striping. In some embodiments, a namespace or similar logical storage designation may be used to map the host system to storage device 120.1 and its host interface resources, such as interconnect fabric interface 301, controller memory buffer 306.1, and the host command queues 306.2 and host data cache 306.3. For example, the host system may direct host storage commands to the namespace to send those host storage commands to queues 306.2, send host data units for writing to cache 306.3, and receive host data units read back from the peer storage devices through cache 306.3. In some embodiments, queues 306.2 may be comprised of queue pairs that also include response queues for returning storage command results to the host system, such as confirmation of write operations and/or buffer location of returned read data. Host command handler 322.2 may be configured to handle both host write commands subject to data striping and other host storage commands for reading, deleting, or otherwise manipulating that data, regardless of which peer storage device is actually storing the host data. For example, host command handler 322.2 may act as a command forwarder for subsequent host storage commands targeting previously stored host LBAs and use host LBA mapping table 322.1 to direct those commands.

Peer tracking module 322.3 may be configured to receive peer state data from each storage device 120 in the peer group. For example, peer tracking module 322.3 may send a query to each other storage device 120 using peer communication module 326 and receive a response message including a storage device identifier and one or more peer state data values. In some embodiments, peer tracking module 322.3 may receive one or more messages with performance parameter values without sending a query to initiate the message. For example, each storage device may be configured to broadcast one or more state data values over the peer communication channel on a periodic basis. In some embodiments, each storage device may publish one or more state data values to a known memory location in controller memory buffer 306.1 for read access by the other peer storage devices and/or the master storage device only. In some embodiments, peer tracking module 322.3 may store peer state data from each storage device in peer device registry 328 for later use, such as by striping logic 322.4. In some embodiments, peer tracking module 322.3 may be configured to selectively request and/or collect peer state data that includes workload state values, thermal state values, endurance values, and capacity values.

Striping logic 322.4 may include one or more functions for determining how host data from host write commands are allocated among the peer storage devices. For example, striping logic 322.4 may be configured for dividing a particular host data unit size into a plurality of smaller data blocks for distribution among the peer storage devices. In some embodiments, striping logic 322.4 may use a fixed stripe size equal to one or more host data units, such as a host block size (e.g., 512, 2K, 4K, etc. bytes) that correspond to a predetermined number of striping data blocks. Striping logic 322.4 may then allocate the number of striping data blocks among target peer storage devices. In some embodiments, striping logic 322.4 may use buffering of host data units in cache 306.3 to assist in aggregating host data units, dividing them into striping data blocks, and allocating them among the peer storage devices. In some configurations, striping logic 322.4 may be configured to evenly distribute host data blocks among the peer storage devices, such as dividing host data units into a number of host data blocks equal to the number of storage devices in the peer group or using a round robin or similar scheme to distribute host data blocks evenly across the storage devices. In some embodiments, striping logic 322.4 may return a list of host LBAs allocated to each target peer storage device for each host write command and the host data units they contain.

For high bandwidth applications, efficiently allocating the host data units from host write commands may include actively balancing the rates at which host blocks are allocated among peer storage devices with their real-time states and processing capabilities. For example, when operating near peak throughput, individual storage devices may encounter differences in processing times and queue depths, such as due to background operations, interruptions, extended error recovery, limited failures, and/or competing non-write commands (such as reads that may not be evenly distributed among the peer storage devices). In some embodiments, striping logic 322.4 may use workload state values for each storage device to weight how new write data blocks are allocated among the storage devices. For example, striping logic 322.4 may base allocation decisions on avoiding storage devices that are over a workload threshold or exhibit a particular workload state. In some embodiments, storage devices may provide tiered workload states that identify their relative workload, such as based on queue depths, predicted processing times, competing (but necessary) background operations, and/or other dynamic workload models, and striping logic 322.4 may group and compare the peer devices by workload states to allocate to storage devices with lower workload states first.

In some embodiments, striping logic 322.4 may use thermal state values for each storage device to dynamically avoid storage devices that are at or near critical thermal levels, which could impact the reliability of the storage device or trigger processor throttling to force device cooling. For example, striping logic 322.4 may base allocation decisions on avoiding storage devices that are over a thermal threshold or exhibit a particular thermal state (such as thermal throttling). In some embodiments, striping logic 322.4 may include long-term endurance, lifetime load balancing, and/or wear levelling considerations in allocating among the peer storage devices. For example, striping logic 322.4 may compare endurance values, such as TBW, among peer storage devices and preferentially select those with lower values and/or avoid those with higher values. The foregoing striping logic examples are examples only and other configurations for applying cache-based data striping configurations and device-state based rate levelling across a group of storage devices may be applied by striping logic 322.4.

Peer command manager 322.5 may use the allocation decisions made by striping logic 322.4 to generate storage commands to the peer storage devices for storing the host data. For example, peer command manager 322.4 may receive the list of host LBAs and corresponding target storage devices and generate one or more peer storage commands to each peer storage device selected to receive host data from one or more host storage commands. In some embodiments, peer command manager 322.5 may be configured similarly to a host system for sending storage commands to the peer storage devices. For example, peer command manager 322.5 may use RDMA to send a peer storage command directly to a command queue in the controller memory buffer of the target peer storage device and/or to write the host data block for the write command to write cache in the controller memory buffer. In some embodiments, peer command manager 322.5 moves host data blocks from the buffer memory locations in host data cache 306.3 directly to the write caches of the target storage devices using the peer communication channel and direct memory access. In some embodiments, more conventional messaging or streaming paradigms for peer data transfer may be used, such as including host data in write command message payload. In some embodiments, peer command manager 322.5 may also generate internal storage commands for host data blocks allocated to the master storage device and such commands may be processed by storage command handler 336 and/or directly as storage operations by media manager 324.

In some embodiments, media manager 324 may include interfaces, functions, parameters, and/or data structures for managing access to and maintenance of media devices 140. For example, media manager 324 may include base FTL services for storage device 120 and manages the storage device FTL map, as well as read, write, and data management access media devices 140. Host storage commands (including corresponding peer storage commands from the master storage device) involving host data reads, writes, erases, etc. may be directed to media manager 324 as one or more storage operations and processed through media interface 308 for accessing media devices 140. In some embodiments, host data commands may be pre-processed by storage command handler 336 and related internal data access commands (e.g., storage operations) may be received by media manager 324. In some embodiments, storage device FTL provides a base level of FTL mapping for storage device 120. Storage device FTL may include allocation of storage locations with a defined size based on compatibility of with storage units in media devices 140.1, such as page size. For example, storage locations may be allocated as 4 kilobyte (KB) or 8 KB pages. In some embodiments, allocation sizes for storage locations may correspond to larger multiplane NVM page sizes, such as 96 KB. In some embodiments, host LBAs received in storage commands and included in corresponding storage operations may be mapped to the physical storage locations by storage device FTL.

Media manager 324 may be responsible for bad block management, bad block spare overprovisioning, and allocation of gap free logical space throughout the life of the media devices 140. In some embodiments, media manager 324 may also include error correction (e.g., low-density parity-check (LDPC) or Bose-Chaudhuri-Hocquenghem (BCH) codes) supported by an error correction engine and tuning of NVM access parameter (e.g., read levels, programming thresholds, etc.). Media manager 324 may enable reads from logical block address (LBA) storage locations in media devices 140 to write in remotely addressable memory 306 and reads from remotely addressable memory 306 to writes in LBA storage locations in media devices 140.

In some embodiments, peer communication module 326 may include interfaces, functions, parameters, and/or data structures for providing communication among storage devices 120 using interconnect fabric 114 without being routed through storage controller 110 or another host or controller component. For example, peer communication module 326 may enable drive-to-drive messaging addressed by storage device identifiers, peer-drive broadcasts that provide the same message to all peer storage devices, and/or access to shared memory locations, such as remotely addressable memory 306 for direct data transfer and/or access of host and parity data, data management logs, peer storage commands, etc. Any (or all) of these communication modes may be used to establish a peer communication channel between and among peer storage devices. In some embodiments, packetized messages may be routed among storage devices 120.1 using one or more network communication protocols compatible with interconnect fabric 114.

In some embodiments, peer communication module 326 operates in conjunction with RDMA interface 304 to manage local and remote use of remotely addressable memory 306 and, more specifically, controller memory buffer 306.1. For example, local operations by media manager 324 may include writes and reads to cache 306.3 in remotely addressable memory 306, read/write operations may include coordinated use of cache space and command queues 306.2 in remotely addressable memory 306 for both local and remote access, and other distributed operations may use space in remotely addressable memory 306 as requested by the master storage device or other peer storage devices.

In some embodiments, peer device registry 328 may include a data structure for maintaining information regarding each other peer storage device in a peer group, such as storage devices 120 in tiered storage array 106. For example, peer device registry 328 may be a table, list, array, database, or similar data structure for storing peer storage device identifiers 328.1, other addressing information, and/or additional information on peer storage devices, such as specifications and/or parameters of the storage devices. In some embodiments, peer device registry 328 may include peer state data 328.2 for each storage device. For example, peer tracking module 322.3 may store the peer state data values collected, received, and/or determined from each peer storage device in state data fields indexed by peer storage device identifiers 328.1. In some embodiments, peer device registry 328 may be stored in storage array metadata repeated in each storage device in tiered storage array 106.

In some embodiments, performance monitor 330 may include interfaces, functions, parameters, and/or data structures for monitoring one or more performance characteristics that may change during operation of storage device 120.1. For example, performance monitor 330 may monitor changes in workload states, thermal states, endurance, and capacity.

Workload state machine 330.1 may include one or more state values for data read/write operations, such as queue depths, estimated read time, estimated write time, estimated move time, sequential or random series measurements, and aggregated calculations of bandwidth or I/O operations per second (IOPS), including peaks and/or averages, based on present workload conditions. Workload state machine 330.1 may include one or more workload models for determining current processor, memory, data channel, and/or similar resource usage and/or predicting ongoing local workload state based on command queues, background operations, and similar factors. In some embodiments, workload state machine 330.1 may determine one or more aggregate workload state values that provide a scaled or relative workload quantification for comparing the current workloads of similar storage devices, such as peer storage devices.

Thermal state machine 330.2 may include one or more state values for the temperature of storage device 120.1 and/or various components thereof. For example, thermal state machine 330.2 may use a combination of temperature sensor data, thermal modelling of hardware components, and/or thermal memory and dissipation rates to determine a current thermal state of the storage device. In some embodiments, thermal state values may include temperature values or may include a qualitative scale of thermal operating ranges. In some embodiments, thermal state machine 330.2 may include one or more throttling thresholds that, if met, force storage device 120.1 to throttle processing operations and/or power draw to allow cooling and protect the device. For example, one or more thermal state values may relate to low, normal, and high temperature states, as well as forced throttling and/or shut down states for thermal management.

Endurance value 330.3 may include one or more metrics for measuring NVM wear. Endurance may be based on predicted reliability for a particular storage device (in terms of write capacity) and the number of lifetime writes that have been made to the storage device. For example, performance monitor 330 may track lifetime writes as a TBW value. In some embodiments, other indicators, such as error rates, allocation of reserved blocks, and/or internal media management metrics used for wear balancing, GC, read/write parameters, etc. may be used to calculate endurance values. Endurance value 330.3 may include a percentage of the predicted life of the storage device that has been used, such as 10% for a relatively new drive, 50% for the midpoint of the drives predicted life, or 90% for a drive approaching end of life.

Capacity value 330.4 may include one or more metrics describing the current memory capacity of media devices 140, generally in terms of bytes measured at an appropriate order of magnitude (e.g., megabyte (MB), gigabyte (GB), terabyte (TB), petabyte (PB), etc.). Storage capacity 330.1 may change over time as bad blocks, cells, and/or devices are identified over time. In some embodiments, peer rate leveller 322 may use available capacity in striping logic 322.4 and/or to manage the total capacity of the storage array for host LBA mapping table 322.1 and providing aggregate capacity to the host system.

In some embodiments, performance reporting module 332 may include interfaces, functions, parameters, and/or data structures for enabling storage device 120.1 to make peer state data monitored by performance monitor 330 available to other systems, including peer storage devices. For example, performance monitor 330 may place reported values in a data structure and performance reporting module 332 may use the values in the data structure to respond to queries from other systems, such as peer tracking module 322.3 (particularly when another peer storage device has the master storage device role). In some embodiments, peer storage devices may send performance queries via peer communication messages to storage device 120.1 requesting peer state data and performance reporting module 332 may respond with the requested peer state data values. In some embodiments, performance reporting module 332 may log performance characteristic values in a memory location accessible to other systems, such as remotely addressable memory 306.

In some embodiments, storage command handler 336 may include interfaces, functions, parameters, and/or data structures for receiving and parsing host and/or peer storage commands and other messages from other storage devices and systems. Storage command handler 336 may include an addressable communication channel for receiving messages from other systems or subsystems, such as hosts, storage controllers, and peer storage devices (e.g., host 102, storage controller 110, or storage devices 120). In some embodiments, storage command handler 336 may receive data management commands or requests that can be executed by the memory and compute resources of storage device 120.1, alone or in conjunction with peer storage devices. In some embodiments, storage command handler 336 may include or operate in conjunction with host command handler 322.2 for receiving and processing host storage commands. Storage command handler 336 may receive and process peer storage commands, such as peer (or internal) storage commands from peer command manager 322.5 or another peer storage device acting as master storage device. Storage command handler 336 may parse the received storage commands to determine command parameters and/or identify or locate corresponding host data units for write commands. In some embodiments, storage command handler 336 may place incoming storage commands in one or more command queues 306.2, such as host command queues or peer command queues, and process them based on queue order and/or priority. In some embodiments, storage command handler 336 may initiate read, write, and other storage operations based on the storage commands, target host data, and related command parameters, such as by passing storage operations to media manager 324.

In some embodiments, master handoff logic 338 may include interfaces, functions, parameters, and/or data structures for determining a transition of the master storage device role, identifying the next master storage device among the peer devices, and transitioning the functions of peer rate leveller 322 to the new master storage device. For example, storage device 120.1 may use peer rate leveller 322 to manage host commands and data striping for the peer group for an operating period then, based on a trigger condition, pass the master storage device role to another storage device, such as peer storage device 120.2. In some embodiments, the trigger conditions may include the health of storage device 120.1, an indication from an administrative system or user, and/or according to a scheduled rotation of the master storage device role. Responsive to the trigger condition, master handoff logic 338 may determine the new master storage device from among the peer storage devices. For example, a backup or next storage device may be configured in master handoff logic 338, an indication to handoff may identify the target storage device for the handoff, and/or master handoff logic 338 may include an order or selection algorithm (e.g., random, round-robin, etc.) for selecting the next master storage device.

Responsive to determining the next master storage device, master handoff logic 338 may initiate a transfer of peer rate leveller functions. In some embodiments, each storage device may include an instance of peer rate leveller 322 and the instance in the new master storage device may be activated and/or installed from a firmware package in the storage device. In other embodiments, an administrative system may update the firmware of the storage device to add a peer rate leveller. Master handoff logic 338 may then initiate a transfer of host LBA mapping table 322.1 to the new master storage device. In some embodiments, master handoff logic 338 may transfer peer state data 328.2 or it may be determined independently by the new master storage device using the peer tracking module in the activated peer rate leveller. In some embodiments, the host system may then be remapped to the new master storage device for receiving and processing host storage commands in a next operating period. For example, the host command queues and host cache may be mapped to the controller memory buffer of the new master storage device. In some embodiments, host storage commands may be suspended for a transfer period to allow the command queues and cache from storage device 120.1 to clear and host LBA mapping table 322.1 to be fully transferred and updated in the new master storage device.

Figure 4:
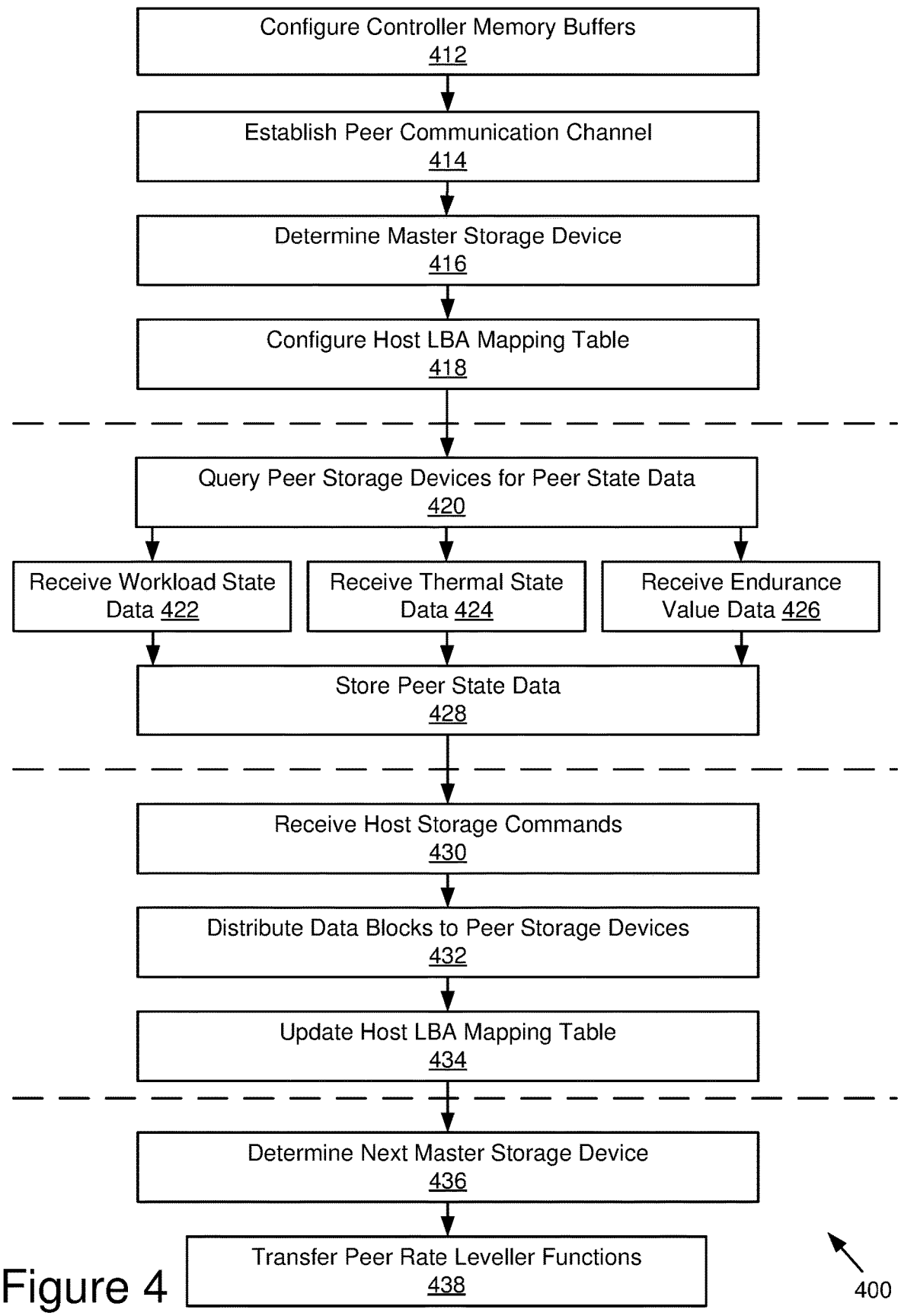
FIG. 4 illustrates an example method of rate levelling using a master storage device in a group of peer storage devices.

As shown in FIG. 4, storage system 100 may be operated according to an example method for rate levelling using a master storage device in a group of peer storage devices, i.e., according to method 400 illustrated by blocks 412-438 in FIG. 4. In some embodiments, blocks 412-418 may include a configuration phase for the peer group, block 420-428 may include a peer monitoring operation for the selected master storage device, blocks 430-434 may include host storage command processing and data striping by the selected master storage device, and blocks 436-438 may include handoff of the master storage device role to another peer storage device in the peer group.

At block 412, controller memory buffers may be configured. For example, the peer storage devices may be configured with remotely addressable memory configured as controller memory buffers according to NVMe interface protocols.

At block 414, a peer communication channel may be established. For example, peer storage devices may be configured with a peer device registry identifying the peer storage devices in the peer group using an administrative configuration page, discovery service, and/or one or more node mapping processes.

At block 416, a master storage device may be determined. For example, the storage system may be configured with a master storage device or include logic for assigning the master storage device role for an operating period.

At block 416, a host LBA mapping table may be configured. For example, the master storage device selected at block 416 may instantiate a host LBA mapping table for all host storage locations across the peer group and populate the host LBA mapping table with LBA information for any host data already stored in the peer group.

At block 420, peer storage devices may be queried for peer state data. For example, the master storage device may send a query and/or read peer state data values published or broadcast by each peer storage device.

At block 422, workload state data may be received. For example, the master storage device may receive at least one workload state value from each peer storage device.

At block 424, thermal state data may be received. For example, the master storage device may receive at least one thermal state value from each peer storage device.

At block 426, endurance value data may be received. For example, the master storage device may receive at least one endurance value from each peer storage device.

At block 428, peer state data may be stored. For example, the master storage device may store the peer state data received at blocks 422, 424, and/or 426 in memory, such as in a peer device registry indexed by peer storage device identifiers.

At block 430, host storage commands may be received. For example, the master storage device may receive a host write command for a host data unit represented by one or more host LBAs.

At block 432, data blocks may be distributed to peer storage devices. For example, the master storage device may allocate and send data striping data blocks corresponding to the host data unit in the host write command to a selected set of peer storage devices targeted to receive the data blocks.

At block 434, the host LBA mapping table may be updated. For example, the master storage device may add entries for the host LBAs in the host write command and where the corresponding striping data blocks were written (e.g., the target peer storage device for each striping data block).

At block 436, a next master storage device may be determined. For example, the current master storage device may select a next master storage device for a next operating period.

At block 438, the peer rate leveller functions may be transferred to the new master storage device. For example, the current master storage device may activate a peer rate leveller in the next master storage device, transfer the host LBA mapping table, and remap the host system connection to the next master storage device.

Figure 5:
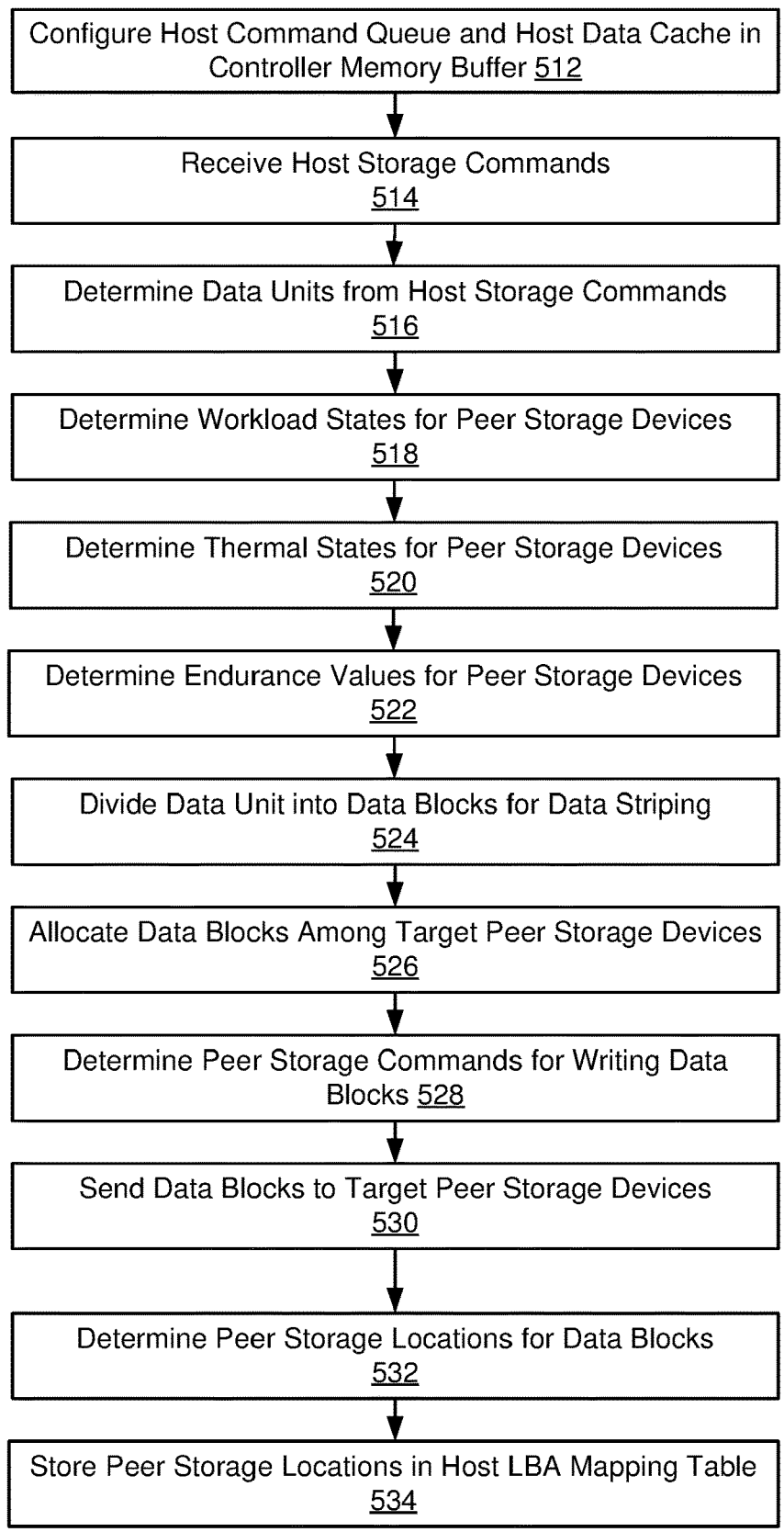
FIG. 5 illustrates example method of handling host storage commands by the master storage device for rate levelling.

As shown in FIG. 5, storage device 120.1 may be operated according to an example method for handling host storage commands by the master storage device for rate levelling, i.e., according to method 500 illustrated by blocks 512-534 in FIG. 5.

At block 512, host command queue and host data cache may be configured in controller memory buffer. For example, the master storage device may include a controller memory buffer that is mapped to the host system for command and response queues and host data write and read caching.

At block 514, host storage commands may be received. For example, the master storage device may receive host write commands for a data unit including one or more host LBAs.

At block 516, data units may be determined from host storage commands. For example, the master storage device may parse the host storage commands to determine command type (write, read, etc.) and target host LBAs.

At block 518, workload states may be determined for peer storage devices. For example, the master storage device may query peer storage devices for workload state data and receive responses including workload state data values for each peer storage device.

At block 520, thermal states may be determined for peer storage devices. For example, the master storage device may query peer storage devices for thermal state data and receive responses including thermal state data values for each peer storage device.

At block 522, endurance values may be determined for peer storage devices. For example, the master storage device may query peer storage devices for endurance values and receive responses including endurance values for each peer storage device.

At block 524, the host data unit(s) may be divided into data blocks for data striping. For example, the master storage device may divide host data units in host data cache into a plurality of data striping data blocks.

At block 526, the data blocks may be allocated among target peer storage devices. For example, the master storage device may select a plurality of peer storage devices (including itself) to receive the data striping data blocks and distribute processing across the peer storage devices based on peer workloads, thermal states, and endurance values.

At block 528, peer storage commands may be determined for writing data blocks to peer storage devices. For example, the master storage device may generate peer write commands for the host LBAs in the data blocks, with the target peer storage devices as destinations.

At block 530, data blocks may be sent to target peer storage devices. For example, the master storage device may write the peer write commands to the peer command queues of the peer storage devices and transfer the host data corresponding to the peer write commands from host cache in its controller memory buffer to write cache in the target peer storage devices' controller memory buffers.

At block 532, peer storage locations may be determined for the data blocks. For example, the master storage device may determine the mapping of the host LBAs to the target peer storage devices receiving those data blocks.

At block 534, peer storage locations may be stored in the host LBA mapping table. For example, the master storage device may store the host LBA to peer storage device identifier mappings in the host LBA mapping table for use in processing subsequent host storage commands targeting those LBAs.

Figure 6:
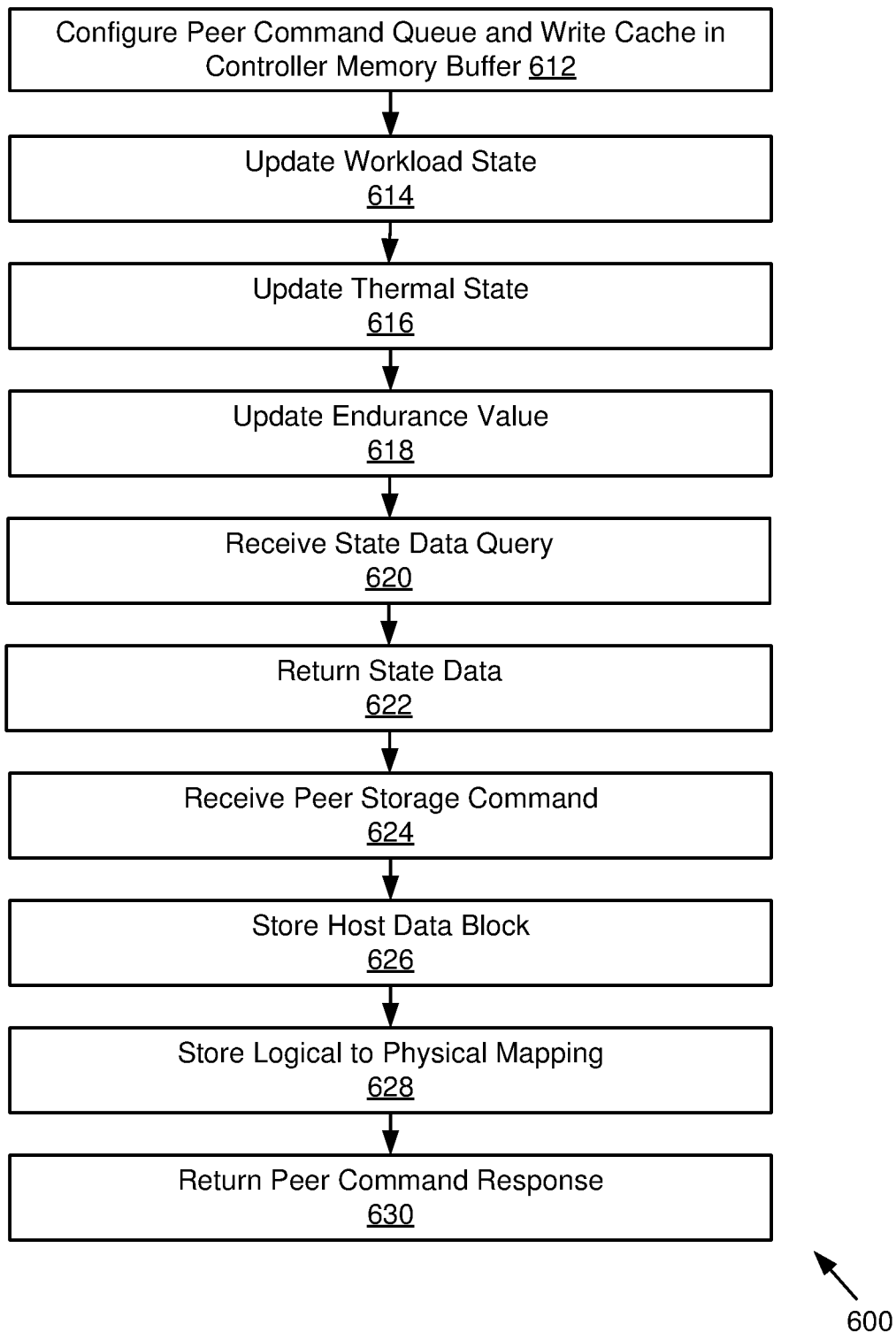
FIG. 6 illustrates an example method of handing peer storage commands by the peer storage devices receiving the data blocks for data striping.

As shown in FIG. 6, peer storage devices 120 may be operated according to an example method for handing peer storage commands and receiving the host data blocks for data striping, i.e., according to method 600 illustrated by blocks 612-630 in FIG. 6.

At block 612, a peer command queue and write cache may be configured in controller memory buffer. For example, each peer storage device may include a controller memory buffer that is mapped to the master storage device for command and response queues and host data write and read caching.

At block 614, a workload state may be updated. For example, each peer storage device may include a workload state machine that periodically updates one or more workload state values.

At block 616, a thermal state may be updated. For example, each peer storage device may include a thermal state machine that periodically updates one or more thermal state values.

At block 618, an endurance value may be updated. For example, each peer storage device may monitor one or more endurance values and periodically update them.

At block 620, a state data query may be received. For example, each peer storage device may receive a peer state data query from the master storage device.

At block 622, state data may be returned. For example, each peer storage device may respond to the peer state data query with the requested peer state values.

At block 624, a peer storage command may be received. For example, target peer storage devices may receive peer write commands corresponding to the data striping data blocks allocated to that peer storage device.

At block 626, host data blocks may be stored. For example, target peer storage devices may receive the host data blocks corresponding to the peer write commands in their write cache and then write those host data blocks into their non-volatile memory devices.

At block 628, logical to physical mapping may be stored. For example, target peer storage devices may store the logical to physical mapping for the stored host data blocks in their FTL data.

At block 630, peer command responses may be returned. For example, responsive to successfully storing the host data blocks in non-volatile memory, the target peer storage devices may return a write confirmation through response queues in their controller memory buffers.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A storage device comprising:
   a non-volatile storage medium;
   an interface configured to communicate with a plurality of peer storage devices over a peer communication channel; and
   at least one processor configured to, alone or in combination:
   receive a host storage command for a data unit from a host system;
   determine workload states for the plurality of peer storage devices;
   divide the data unit into a plurality of data blocks;
   allocate, based on the workload states, the plurality of data blocks to target peer storage devices among the plurality of peer storage devices; and
   send, through the peer communication channel, the plurality of data blocks to the target peer storage devices.

2. The storage device of claim 1, wherein:
   the at least one processor is further configured to, alone or in combination, determine thermal states for the plurality of peer storage devices; and
   allocating the plurality of data blocks to the target peer storage devices is further based on the thermal states.

3. The storage device of claim 1, wherein:
   the at least one processor is further configured to, alone or in combination, determine endurance values for the plurality of peer storage devices; and
   allocating the plurality of data blocks to the target peer storage devices is further based on the endurance values.

4. The storage device of claim 1, wherein the at least one processor is further configured to, alone or in combination:
   query each peer storage device of the plurality of peer storage devices for peer state data;
   receive, from each peer storage device of the plurality of peer storage devices, the peer state data for that peer storage device;
   store the peer state data for each peer storage device of the plurality of peer storage devices; and
   use the peer state data to select the target peer storage devices from among the plurality of peer storage devices.

5. The storage device of claim 1, further comprising:
   a host logical block address mapping table configured to map host logical block addresses to storage locations among the plurality of peer storage devices, wherein the at least one processor is further configured to, alone or in combination:
   determine a peer storage location for each data block of the plurality of data blocks; and
   store, for each data block of the plurality of data blocks, the peer storage location in the host logical block address mapping table.

6. The storage device of claim 1, further comprising:
   a remotely addressable memory configured to include a controller memory buffer, wherein the at least one processor is further configured to, alone or in combination, receive the host storage command in at least one command queue in the controller memory buffer.

7. The storage device of claim 6, wherein:
each peer storage device of the plurality of peer storage devices comprises a peer controller memory buffer configured to receive peer storage commands in at least one peer command queue; and
the at least one processor is further configured to, alone or in combination, send the plurality of data blocks to the target peer storage devices by writing each data block in at least one peer storage command in the at least one peer command queue of a corresponding target peer storage device.

8. The storage device of claim 7, wherein the at least one processor is further configured to send each data block from the controller memory buffer to the peer controller memory buffer of the target peer storage device through the peer communication channel using direct memory access.

9. The storage device of claim 1, wherein the at least one processor is further configured to, alone or in combination:
manage storage operations to the non-volatile storage medium;
determine a local workload state for the storage operations to the non-volatile storage medium, and
allocate, based on the local workload state, at least one data block of the plurality of data blocks to the non-volatile storage medium.

10. The storage device of claim 1, wherein the at least one processor is further configured to, alone or in combination:
determine a next master storage device from the plurality of peer storage devices; and
transfer functions for allocating data blocks to target peer storage devices to the next master storage device.

11. A computer-implemented method comprising:
establishing, among a plurality of peer storage devices, a peer communication channel;
receiving, by a first peer storage device of the plurality of peer storage devices, a host storage command for a data unit from a host system;
determining, by the first peer storage device, workload states for the plurality of peer storage devices;
dividing, by the first peer storage device, the data unit into a plurality of data blocks;
allocating, by the first peer storage device and based on the workload states, the plurality of data blocks to target peer storage devices among the plurality of peer storage devices; and
sending, by the first peer storage device and through the peer communication channel, the plurality of data blocks to the target peer storage devices.

12. The computer-implemented method of claim 11, further comprising:
determining, by the first peer storage device, thermal states for the plurality of peer storage devices, wherein allocating the plurality of data blocks to the target peer storage devices is further based on the thermal states.

13. The computer-implemented method of claim 11, further comprising:
determining, by the first peer storage device, endurance values for the plurality of peer storage devices, wherein allocating the plurality of data blocks to the target peer storage devices is further based on the endurance values.

14. The computer-implemented method of claim 11, further comprising:
querying, by the first peer storage device, each peer storage device of the plurality of peer storage devices for peer state data;
receiving, by the first peer storage device and from each peer storage device of the plurality of peer storage devices, the peer state data for that peer storage device;
storing, by the first peer storage device, the peer state data for each peer storage device of the plurality of peer storage devices; and
using, by the first peer storage device, the peer state data to select the target peer storage devices from among the plurality of peer storage devices.

15. The computer-implemented method of claim 11, further comprising:
determining, by the first peer storage device, a peer storage location for each data block of the plurality of data blocks; and
storing, by the first peer storage device and for each data block of the plurality of data blocks, the peer storage location in a host logical block address mapping table, wherein the host logical block address mapping table is configured to map host logical block addresses to storage locations among the plurality of peer storage devices.

16. The computer-implemented method of claim 11, further comprising:
receiving, by the first peer storage device, the host storage command in at least one command queue in a controller memory buffer configured in a remotely addressable memory of the first peer storage device.

17. The computer-implemented method of claim 16, further comprising:
sending, by the first peer storage device, the plurality of data blocks to the target peer storage devices by writing each data block in at least one peer storage command to at least one peer command queue of a corresponding target peer storage device, wherein each peer storage device of the plurality of peer storage devices comprises a controller memory buffer configured in a remotely addressable memory to receive peer storage commands in at least one peer command queue.

18. The computer-implemented method of claim 17, further comprising:
sending each data block from the controller memory buffer of the first peer storage device to the controller memory buffer of the target peer storage device through the peer communication channel using direct memory access.

19. The computer-implemented method of claim 11, further comprising:
determining a next master storage device from the plurality of peer storage devices; and
transferring functions for allocating data blocks to target peer storage devices from the first peer storage device to the next master storage device.

20. A storage system comprising:
a plurality of peer storage devices, wherein a first peer storage device of the plurality of peer storage devices comprises:
a non-volatile storage medium;
means for establishing, among a plurality of peer storage devices, a peer communication channel;
means for receiving, by the first peer storage device, a host storage command for a data unit from a host system;

means for determining, by the first peer storage device, workload states for the plurality of peer storage devices;
means for dividing, by the first peer storage device, the data unit into a plurality of data blocks;
means for allocating, by the first peer storage device and based on the workload states, the plurality of data blocks to target peer storage devices from among the plurality of peer storage devices; and
means for sending, by the first peer storage device and through the peer communication channel, the plurality of data blocks to the target peer storage devices.

* * * * *